US012686017B2

(12) United States Patent
Ikushima

(10) Patent No.: US 12,686,017 B2
(45) Date of Patent: Jul. 21, 2026

(54) LIQUID MATERIAL DISCHARGE DEVICE

(71) Applicant: MUSASHI ENGINEERING, INC., Mitaka (JP)

(72) Inventor: Kazumasa Ikushima, Mitaka (JP)

(73) Assignee: MUSASHI ENGINEERING, INC., Tokyo (JP)

( * ) Notice: Subject to any disclaimer, the term of this patent is extended or adjusted under 35 U.S.C. 154(b) by 837 days.

(21) Appl. No.: 18/011,901

(22) PCT Filed: Jun. 16, 2021

(86) PCT No.: PCT/JP2021/022911
§ 371 (c)(1),
(2) Date: Dec. 21, 2022

(87) PCT Pub. No.: WO2021/261354
PCT Pub. Date: Dec. 30, 2021

(65) Prior Publication Data
US 2023/0241630 A1 Aug. 3, 2023

(30) Foreign Application Priority Data
Jun. 25, 2020 (JP) ................................ 2020-109692

(51) Int. Cl.
*B05B 1/08* (2006.01)
*B05B 1/30* (2006.01)
(Continued)

(52) U.S. Cl.
CPC ............ *B05B 1/083* (2013.01); *B05B 1/3046* (2013.01); *B05C 5/0225* (2013.01); *B05C 11/1034* (2013.01)

(58) Field of Classification Search
CPC ... B05C 5/0225; B05C 11/1034; B05B 1/083; B05B 1/3046; F02M 51/0603; F16K 31/004
(Continued)

(56) References Cited

U.S. PATENT DOCUMENTS 3,143,131 A * 8/1964 Spencer .................. F16K 31/10
74/110
4,840,193 A * 6/1989 Schiel ..................... F16K 31/10
303/119.2
(Continued)

FOREIGN PATENT DOCUMENTS

CN 106964522 A 7/2017
CN 109332097 A 2/2019
(Continued)

OTHER PUBLICATIONS

International Search Report dated Aug. 31, 2021, issued in counterpart Application No. PCT/JP2021/022911. (2 pages).
(Continued)

*Primary Examiner* — Robert K Arundale
(74) *Attorney, Agent, or Firm* — WHDA, LLP

(57) ABSTRACT

A liquid material discharge device includes: a valve stem having a valve element provided at a tip portion, and a contact portion; a liquid chamber in which the valve element moves forward and backward; a nozzle communicating with the liquid chamber; a valve seat having a hole via which the liquid chamber and the nozzle communicate with each other; an arm that is in separable contact with the valve stem; and a valve driving device configured to move the valve element forward to and backward from the valve seat by causing the arm to pivot. The liquid material discharge device further includes a coupling device that couples the valve stem with
(Continued)

the arm, wherein the coupling device includes a pressing portion that presses the contact portion against the arm.

23 Claims, 13 Drawing Sheets

(51) Int. Cl.
*B05C 5/02* (2006.01)
*B05C 11/10* (2006.01)

(58) Field of Classification Search
USPC .......................................................... 251/231
See application file for complete search history.

(56) References Cited

U.S. PATENT DOCUMENTS

| | | | | |
|---|---|---|---|---|
| 6,595,436 | B2* | 7/2003 | Kirzhner | F02M 51/0603 251/231 |
| 12,551,917 | B2* | 2/2026 | Fliess | B05C 5/0225 |
| 2005/0236438 | A1* | 10/2005 | Chastine | B05C 5/0237 251/238 |
| 2013/0048759 | A1 | 2/2013 | Aguilar et al. | |
| 2015/0221853 | A1* | 8/2015 | Reuter | H10N 30/88 310/328 |
| 2015/0300748 | A1 | 10/2015 | Hong et al. | |
| 2016/0136661 | A1* | 5/2016 | Hong | B05C 5/0225 239/1 |
| 2016/0193624 | A1 | 7/2016 | Ikushima | |
| 2016/0199857 | A1 | 7/2016 | Aguilar et al. | |
| 2016/0221022 | A1 | 8/2016 | Aguilar et al. | |
| 2016/0252192 | A1* | 9/2016 | Sheehan | F16K 31/602 251/231 |
| 2016/0339467 | A1* | 11/2016 | Conner | H10N 30/802 |
| 2017/0274408 | A1 | 9/2017 | Aguilar et al. | |
| 2018/0071766 | A1 | 3/2018 | Ikushima | |
| 2018/0221910 | A1* | 8/2018 | Burzo | B05C 11/1034 |
| 2019/0022692 | A1 | 1/2019 | Ikushima | |
| 2019/0047015 | A1* | 2/2019 | Fukada | B05C 5/0291 |
| 2021/0023585 | A1* | 1/2021 | Fliess | B05C 11/1034 |
| 2021/0138491 | A1* | 5/2021 | Qu | B05B 12/02 |
| 2021/0245188 | A1* | 8/2021 | Felber | B05B 1/3046 |
| 2023/0264222 | A1* | 8/2023 | Ikushima | B05C 5/0225 118/305 |

FOREIGN PATENT DOCUMENTS

| | | | |
|---|---|---|---|
| JP | H06-277597 | A | 10/1994 |
| JP | 2013-046906 | A | 3/2013 |
| JP | 2015-051399 | A | 3/2015 |
| JP | 2018-202312 | A | 12/2018 |
| WO | 2016/159338 | A1 | 10/2016 |
| WO | 2017/122683 | A1 | 7/2017 |
| WO | 2017/204455 | A1 | 11/2017 |

OTHER PUBLICATIONS

International Preliminary Report on Patentability (Form PCT/IPEA/409) issued in counterpart International Application No. PCT/JP2021/022911 dated May 17, 2022. (4 pages).

Office Action dated May 24, 2024, issued in counterpart SG Application No. 11202261064P. (7 pages).

* cited by examiner

[Fig.1]
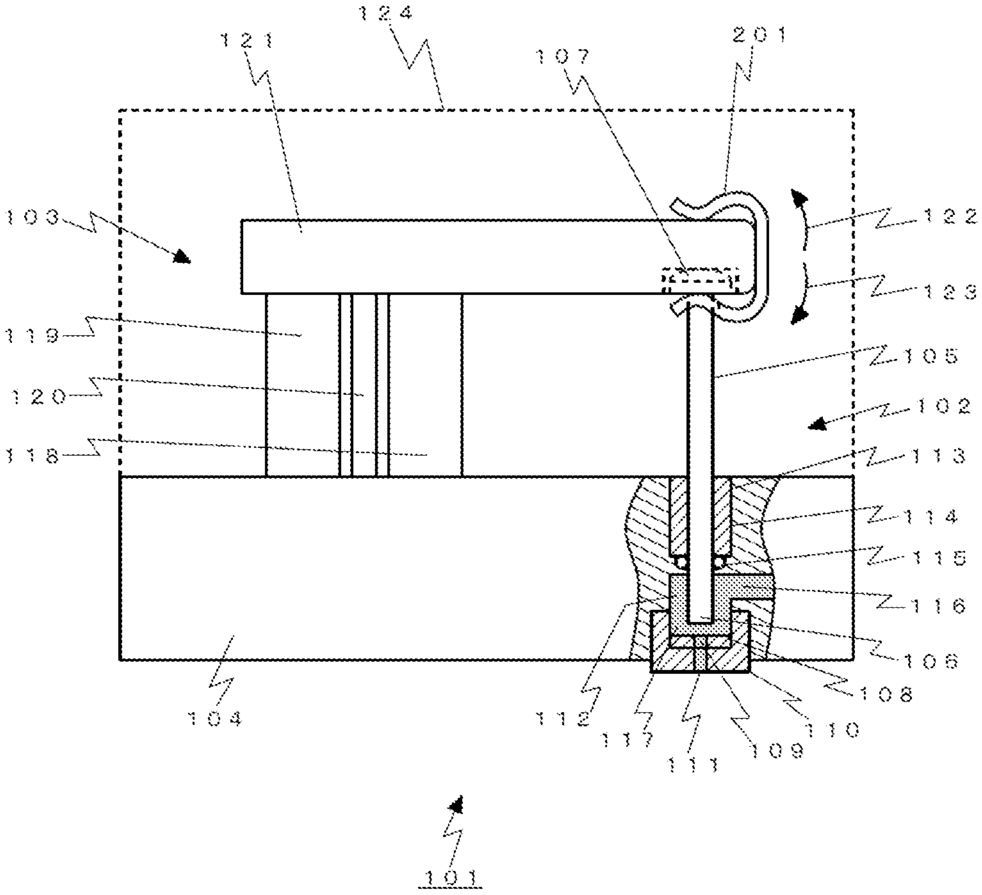

[Fig. 2(A)]
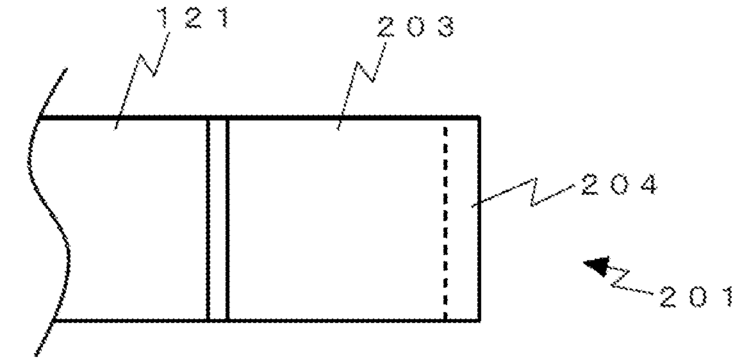
[Fig. 2(B)]
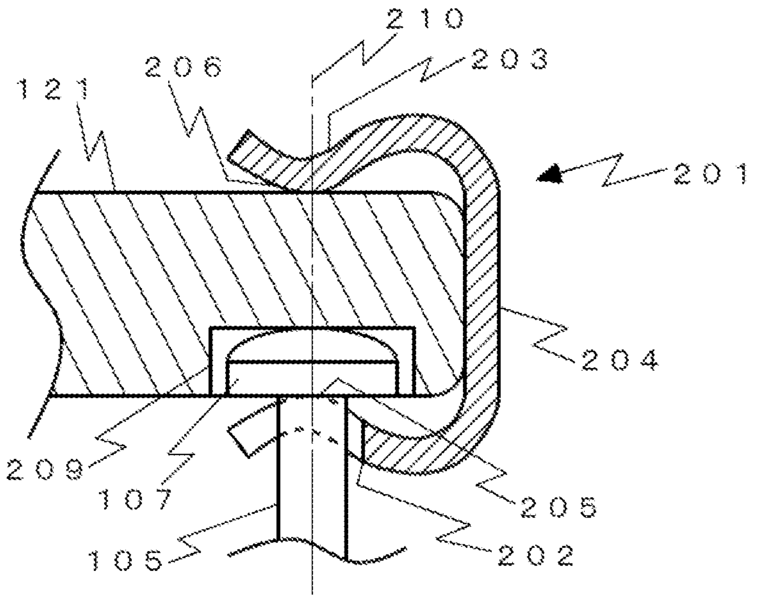
[Fig. 2(C)]
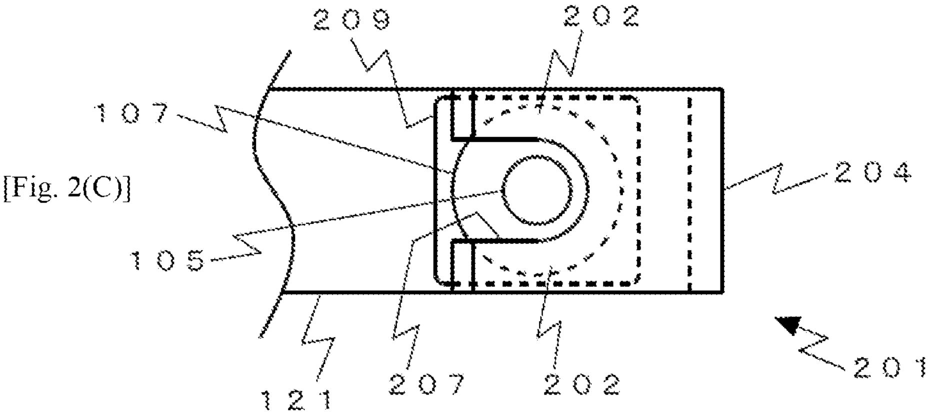

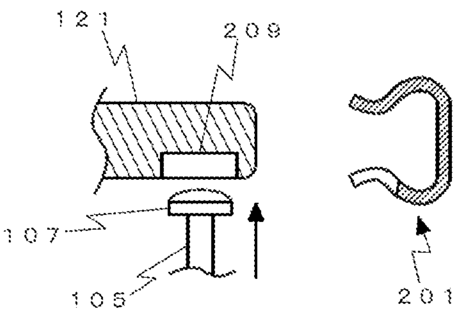
[Fig. 3(A)]
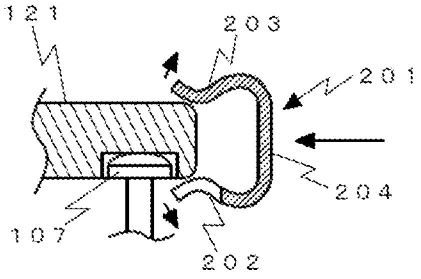
[Fig. 3(B)]
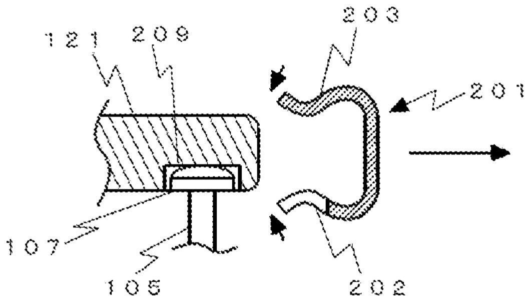
[Fig. 3(C)]
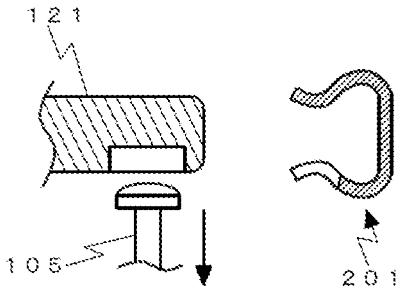
[Fig. 3(D)]

[Fig.4]
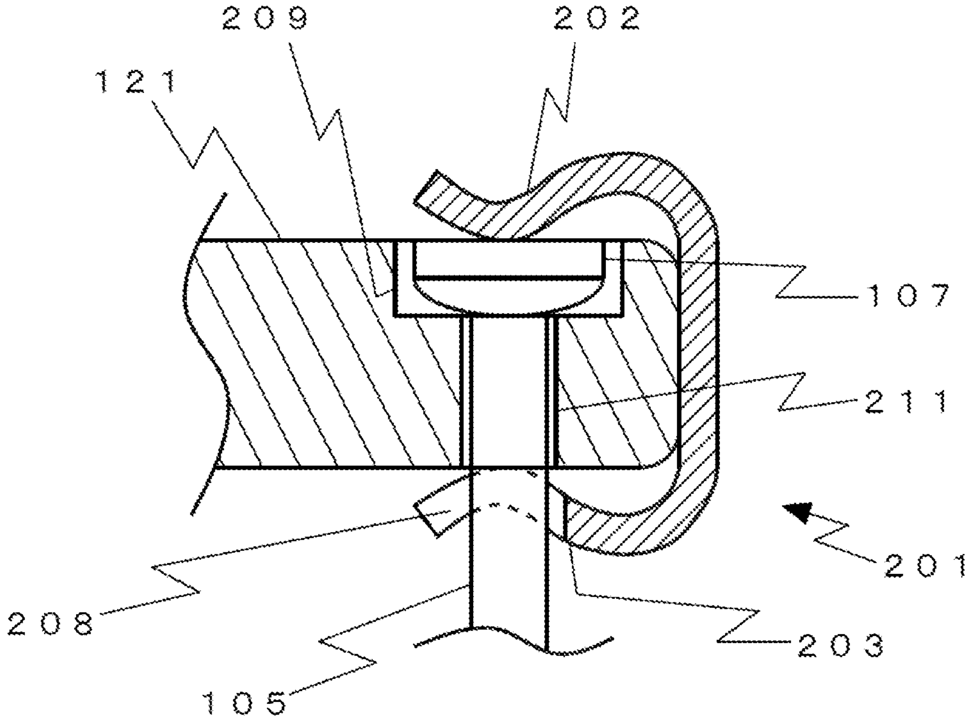

[Fig. 5(A)]
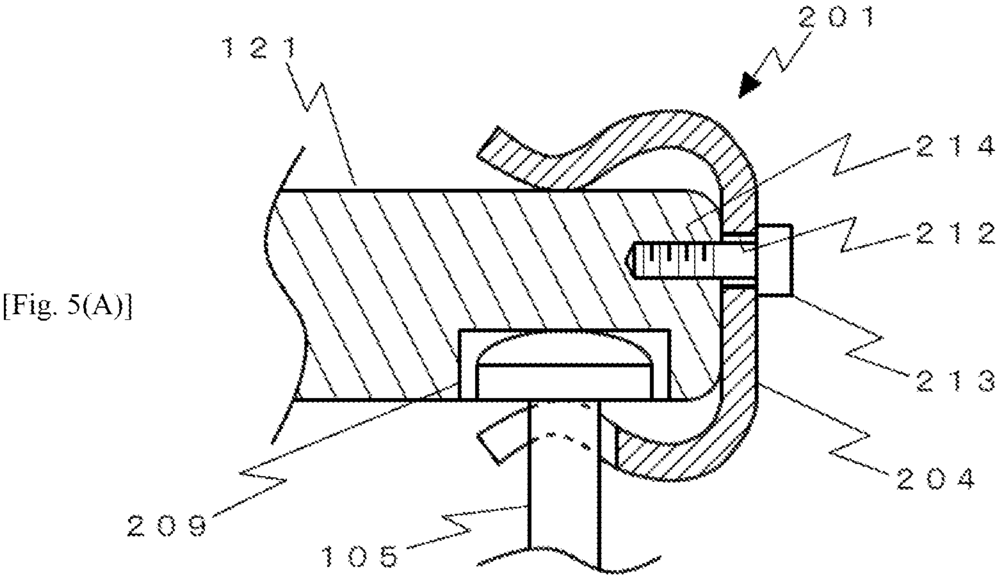
[Fig. 5(B)]
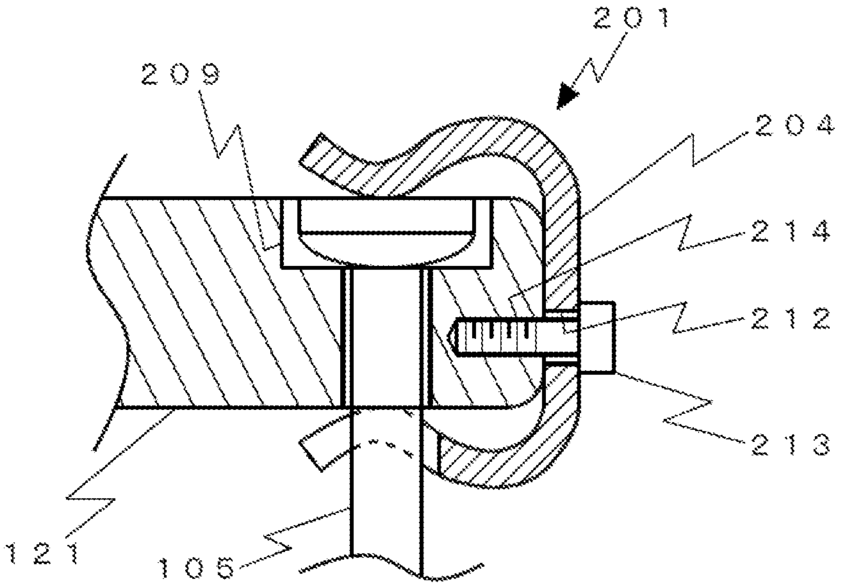

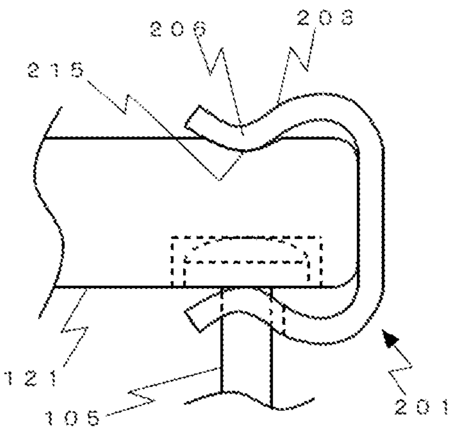
[Fig. 6(A)]
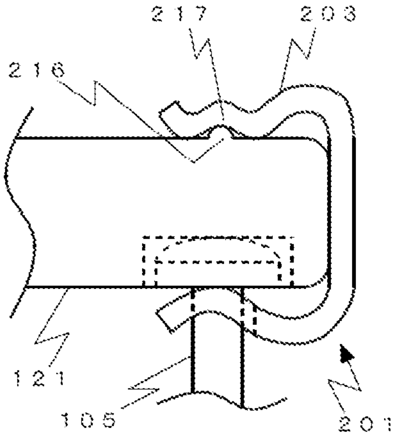
[Fig. 6(B)]
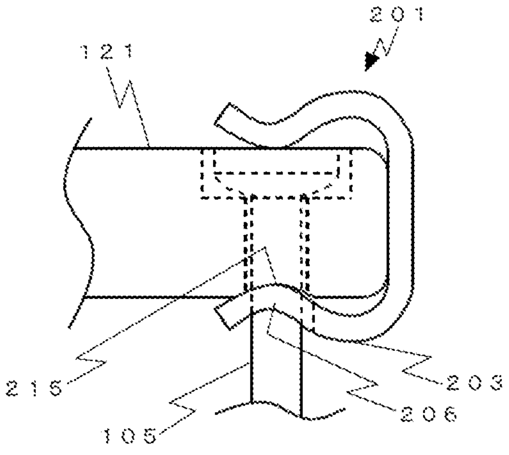
[Fig. 6(C)]
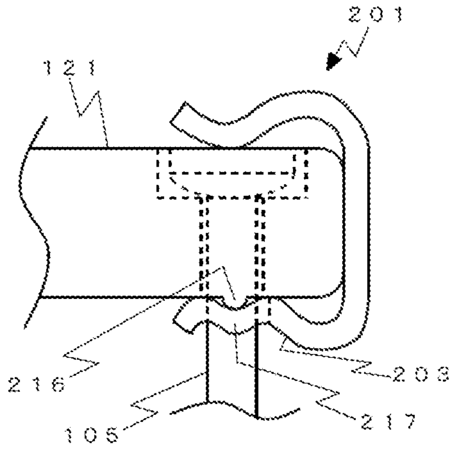
[Fig. 6(D)]

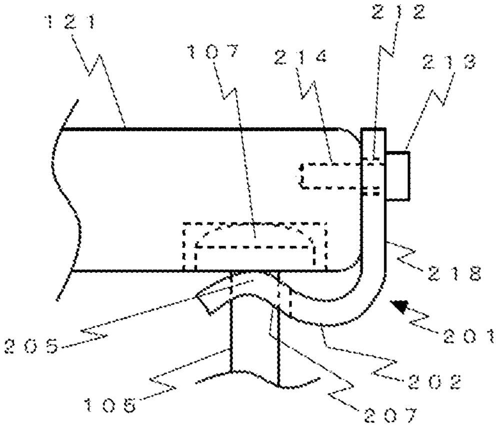
[Fig. 7(A)]
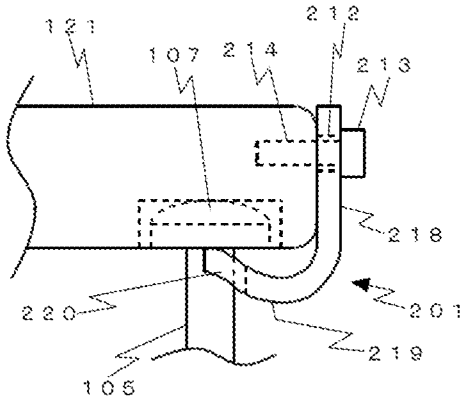
[Fig. 7(B)]
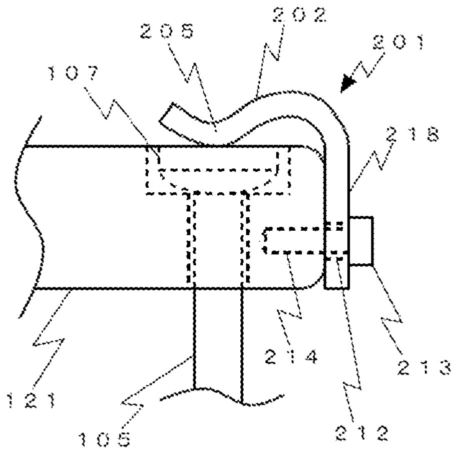
[Fig. 7(C)]
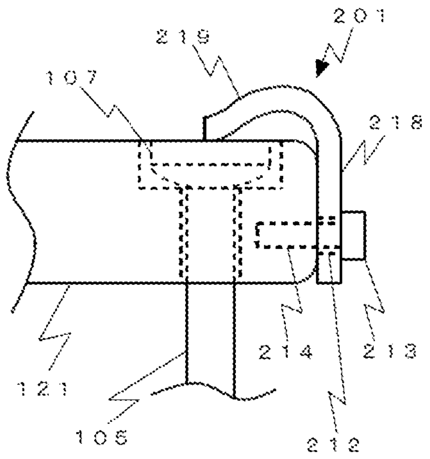
[Fig. 7(D)]

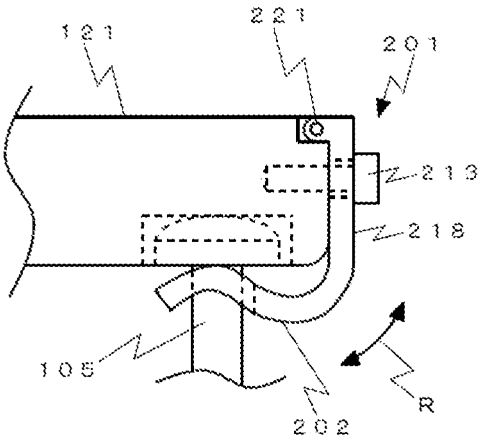
[Fig. 8(A)]
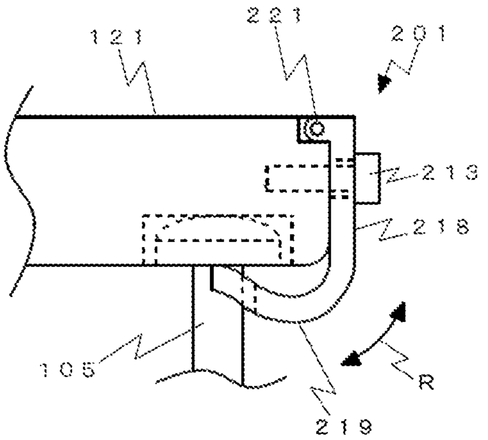
[Fig. 8(B)]
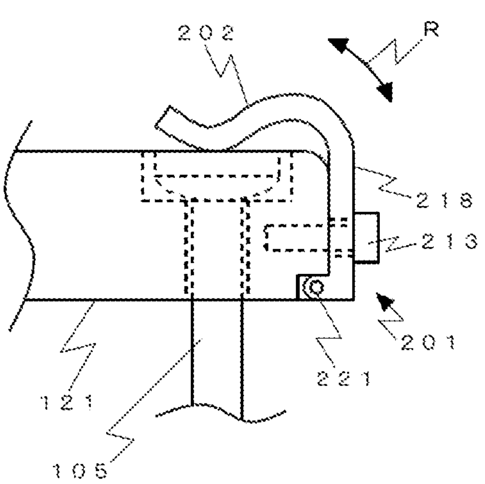
[Fig. 8(C)]
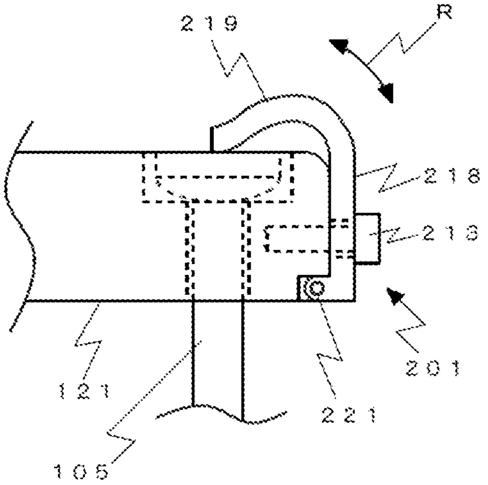
[Fig. 8(D)]

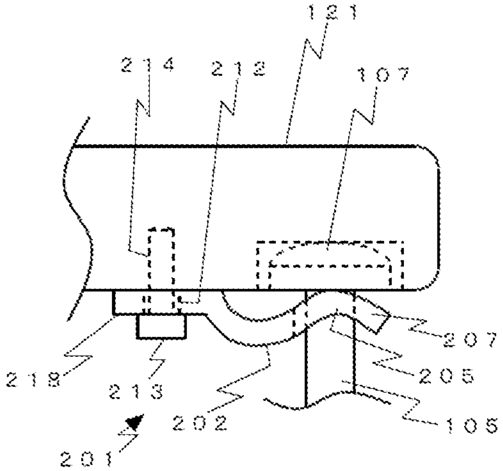
[Fig. 9(A)]
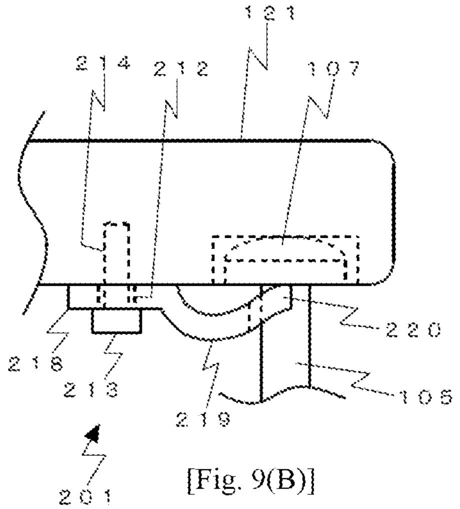
[Fig. 9(B)]
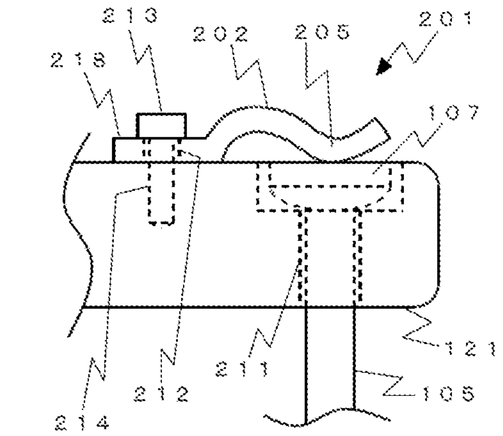
[Fig. 9(C)]
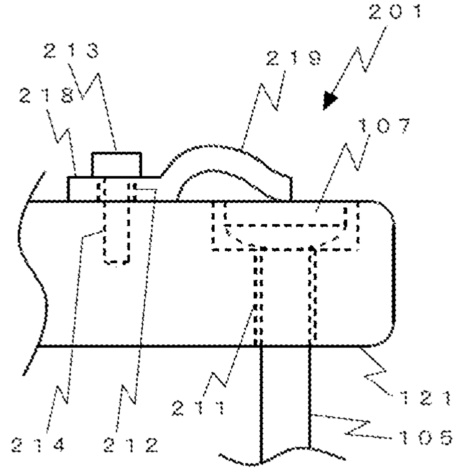
[Fig. 9(D)]

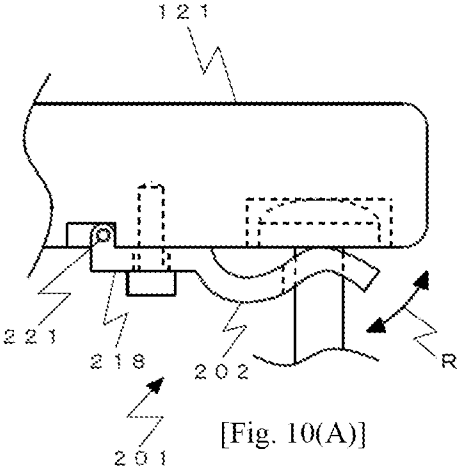
[Fig. 10(A)]
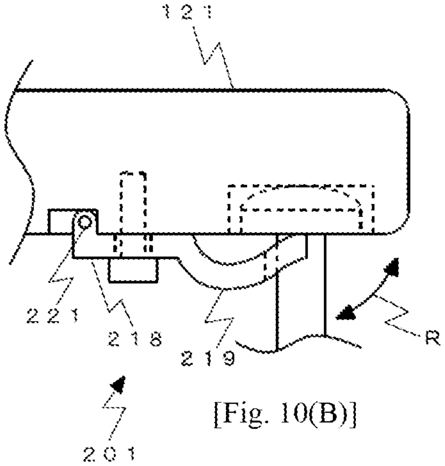
[Fig. 10(B)]
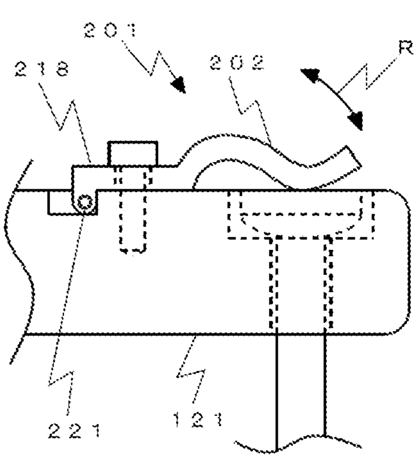
[Fig. 10(C)]
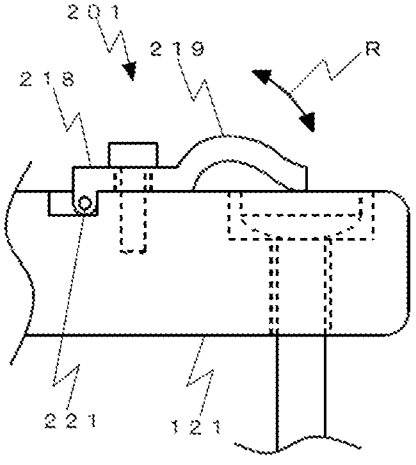
[Fig. 10(D)]

[Fig. 11(A)]
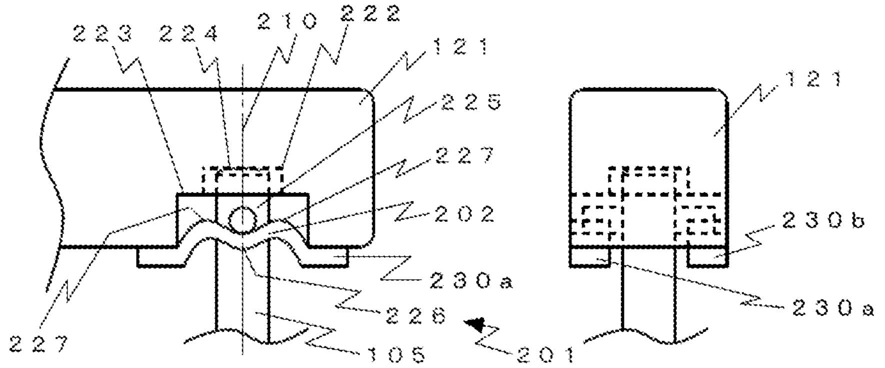
[Fig. 11(B)]
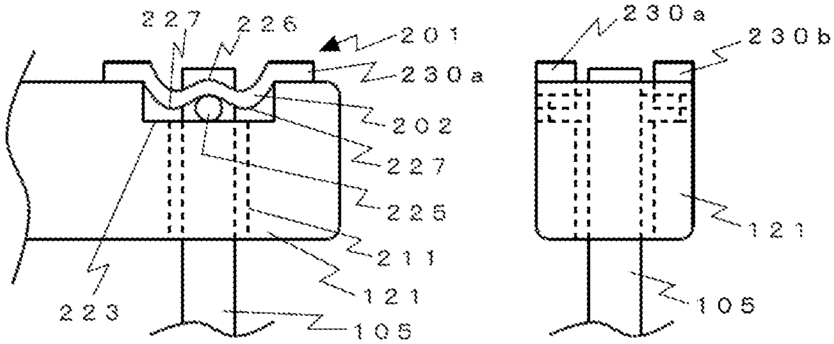
[Fig. 11(C)]
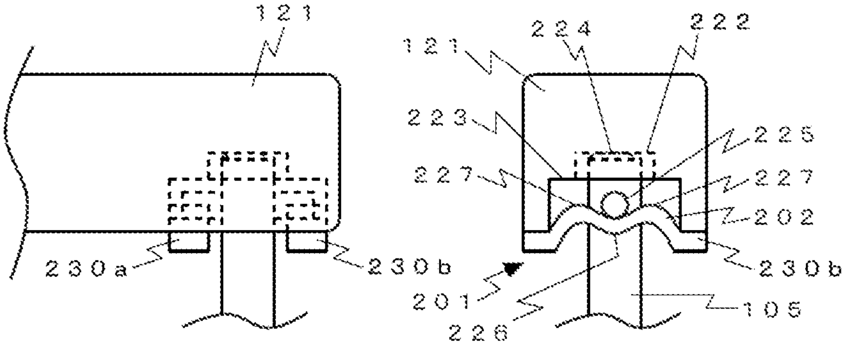
[Fig. 11(D)]
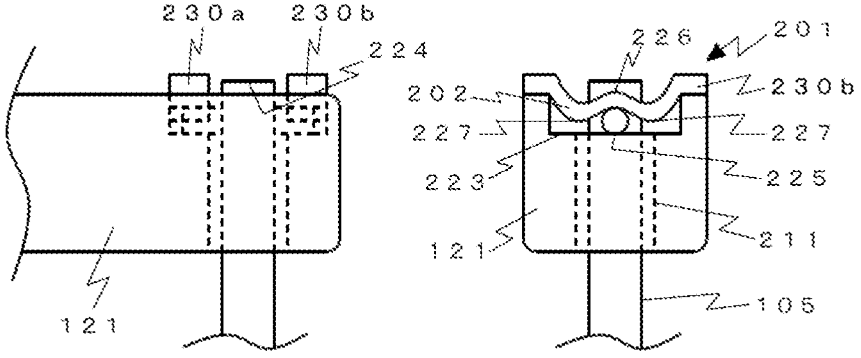

[Fig. 12(A)]
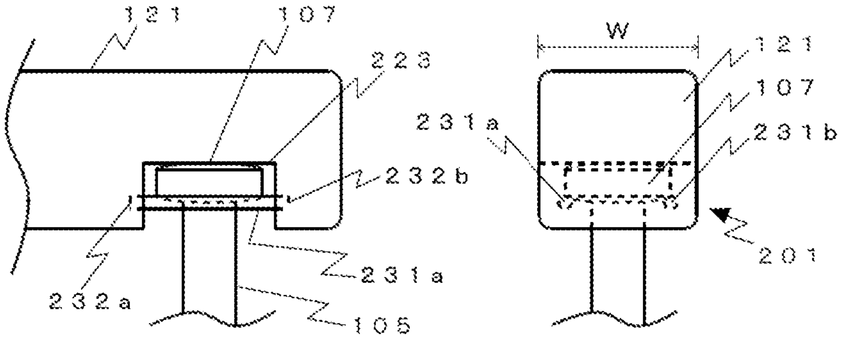
[Fig. 12(B)]
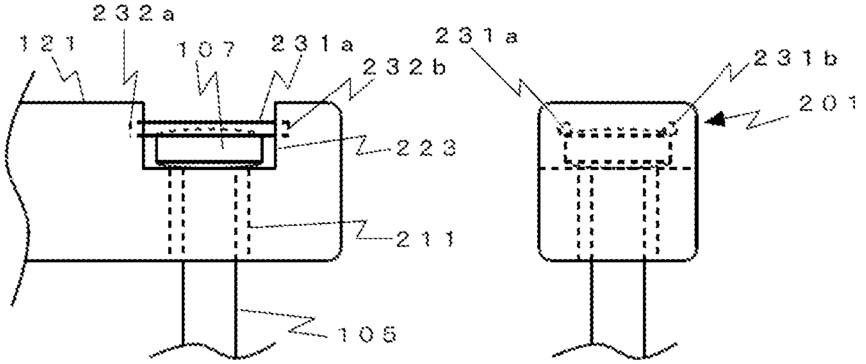
[Fig. 12(C)]
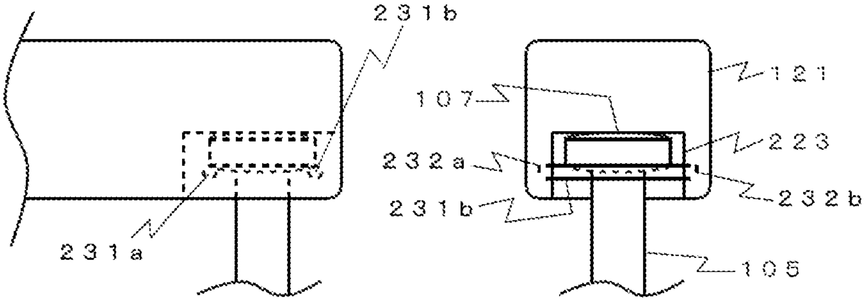
[Fig. 12(D)]
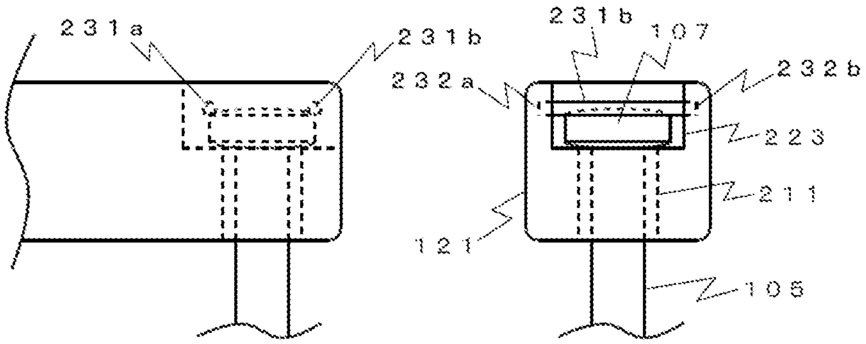

[Fig.13]
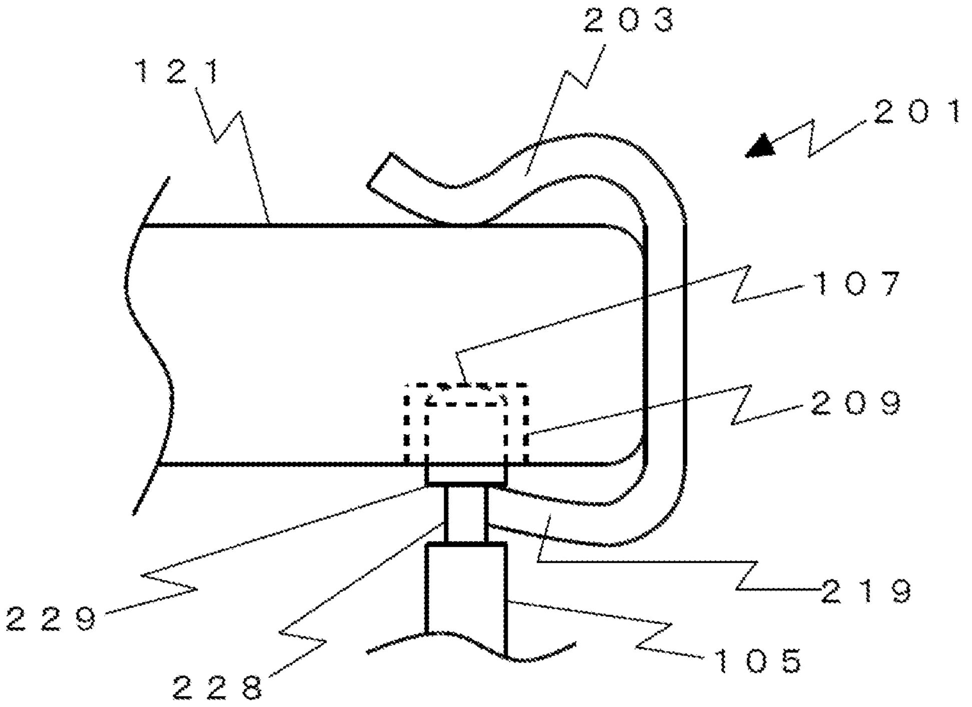

LIQUID MATERIAL DISCHARGE DEVICE

TECHNICAL FIELD

The present invention relates to a liquid material discharge device that discharges a liquid material from a nozzle by moving a valve element mounted on a valve stem forward to and backward from a valve seat.

BACKGROUND ART

There are known discharge devices that discharge a liquid material in a droplet from a nozzle communicating with a hole provided in a valve seat by moving a valve element mounted on a valve stem forward to and backward from the valve seat. In the discharge devices of this type, the valve element mounted on the valve stem is rapidly moved forward by an actuator such as a pneumatic actuator or a piezoelectric element, and a tiny droplet is thereby discharged and flied.

Some of the discharge devices include a mechanism that transmits driving force generated by the actuator to the valve stem without direct coupling of the actuator and the valve stem.

For example, Patent Document 1 discloses a jetting device including: a driving pin that is reciprocated by an actuator; a nozzle including a fluid outlet; a module body including a fluid inlet, a portion that supports the nozzle, and a fluid chamber; a valve seat including an opening communicating with the fluid outlet; a movable element, a part of which defines a boundary of the fluid chamber; and a valve element contained within the fluid chamber and attached to the movable element, wherein the valve element is moved toward the valve seat by contact between the drive pin and a part of the movable element. The jetting device further includes a biasing element that is in contact with the movable element and applies axial spring force to the movable element. The valve element and the movable element are configured to move away from the valve seat under the action of the axial spring force.

Patent Document 2 discloses a liquid material discharge device including: a liquid chamber communicating with a discharge port and being supplied with a liquid material; a plunger having a tip portion that moves forward and backward in the liquid chamber; an elastic body that biases the plunger upward; an arm that presses the plunger downward; and an arm driving device configured to operate the arm. Upward movement of the arm leads to the plunger going upward by biasing force of the elastic body.

PRIOR ART LIST

Patent Document

Patent Document 1: Japanese Patent Laid-Open Publication No. 2013-46906

Patent Document 2: International Publication No. 2017/122683

SUMMARY OF THE INVENTION

Problems to be Solved by the Invention

The devices of the above documents include a spring as a biasing element for moving the valve element or the plunger, which has been moved downward by the actuator, to an original position (upward). For discharging many droplets in a short time, these devices are required to cause the actuator to rapidly move the valve element.

When the valve element is moved rapidly, however, the valve-element motion of moving back to the original position caused by the spring fails to follow the actuator motion, resulting in separation and collision between the actuator and the valve element. This causes a problem that a droplet is not discharged. In order to deal with this problem, the spring constant may be increased so that the valve element can follow the actuator motion. However, greater force is required to move the spring with a larger spring constant, causing a problem that a load on the actuator increases.

In addition, a piezoelectric actuator generally yields a smaller amount of displacement as it generates greater force. Thus, using the spring with a larger spring constant shortens a distance for the valve element to move, which sometimes prevents a necessary movement distance (stroke amount) from being secured.

An object of the present invention is to provide a liquid material discharge device that allows a valve-element motion to follow a rapid actuator motion without using a strong spring.

Means for Solving the Problems

A liquid material discharge device according to the present invention includes: a valve stem having a valve element provided at a tip portion, and a contact portion; a liquid chamber in which the valve element moves forward and backward; a nozzle communicating with the liquid chamber; a valve seat having a hole via which the liquid chamber and the nozzle communicate with each other; an arm that is in separable contact with the valve stem; and a valve driving device configured to move the valve element forward to and backward from the valve seat by causing the arm to pivot. The liquid material discharge device further includes a coupling device that couples the valve stem with the arm, and wherein the coupling device includes a pressing portion that presses the contact portion against the arm.

In the liquid material discharge device, the arm may have a reception portion where the contact portion of the valve stem is disposed, and when the arm pivots, the contact portion of the valve stem may roll on the reception portion.

In the liquid material discharge device, the pressing portion may be constituted by a plate-like elastic body.

In the liquid material discharge device, the reception portion may be formed in a top surface of the arm, wherein the arm may include a through-hole through which the valve stem is inserted, the through-hole being provided in the reception portion, wherein the contact portion may be wider than the valve stem, and have a flat top surface and a rounded bottom surface.

In the liquid material discharge device, the reception portion of the arm may be formed in a bottom surface of the arm, wherein the contact portion may be wider than the valve stem, and have a flat bottom surface and a rounded top surface.

In the liquid material discharge device, the pressing portion may include a cutout portion in which the valve stem is disposed.

In the liquid material discharge device, the coupling device may further include a locking portion extending in a same direction as the pressing portion, and a connecting portion connecting the locking portion with the pressing portion, and wherein the arm may be held between the locking portion and the pressing portion.

In the liquid material discharge device, the locking portion may include a vertex portion that is in contact with the arm.

In the liquid material discharge device, the arm may include a depressed portion that receives the vertex portion of the locking portion.

In the liquid material discharge device, the locking portion may include at least two vertex portions that are in contact with the arm, and a depressed portion located between the at least two vertex portions, wherein the arm may include a protruded portion received in the depressed portion of the locking portion.

In the liquid material discharge device, the pressing portion may include a vertex portion that is in contact with the contact portion.

The liquid material discharge device may include a fastening member that fastens the coupling device to the arm, wherein the connecting portion may include a hole through which the fastening member is inserted.

In the liquid material discharge device, the coupling device may include a fixing portion continuous with the pressing portion, and a fastening member that fixes the fixing portion to the arm.

In the liquid material discharge device, the fixing portion may extend in a direction substantially perpendicular to the pressing portion and may be fixed to a tip portion of the arm with the fastening member.

In the liquid material discharge device, the fastening member may be fixed to a top surface or a bottom surface of the arm.

In the liquid material discharge device, the pressing portion may include a vertex portion that is in contact with the contact portion.

In the liquid material discharge device, the vertex portion of the pressing portion may be located at an end of the pressing portion.

The liquid material discharge device may include an axle portion that pivotally fixes the coupling device to the arm.

In the liquid material discharge device, the pressing portion may be constituted by a pair of bridges provided on the arm.

In the liquid material discharge device, the pressing portion may include plate-like elastic bodies having a depressed portion, wherein the contact portion may include a first contact portion that is in contact with the arm, and second contact portions that project from the valve stem and are pressed by the depressed portions of the pair of bridges.

In the liquid material discharge device, the pressing portion may include round-bar-like elastic bodies, wherein the contact portion may have a rounded top surface and a rounded bottom surface.

In the liquid material discharge device, the valve stem may include a narrow portion forming a stepped portion, wherein the pressing portion may press the stepped portion.

In the liquid-material discharge device, the valve driving device may include a piezoelectric actuator.

In the liquid material discharge device, the valve driving device may be configured to move the valve element forward to discharge a droplet from the nozzle. Advantageous Effect of the Invention According to the present invention, it is possible to provide a liquid material discharge device that allows a valve-element motion to follow a rapid actuator motion without using a strong spring.

It is also possible to secure a stroke amount that is required depending on use.

BRIEF DESCRIPTION OF THE DRAWINGS

FIG. 1 is a partial cross-sectional view illustrating a discharge device including a coupling device according to a first embodiment.

FIGS. 2(A) to 2(C) are a partial enlarged view illustrating details of the coupling device according to the first embodiment. Here, FIG. 2(A) shows a top view, FIG. 2(B) shows a partial cross-sectional side view, and FIG. 2(C) shows a bottom view.

FIGS. 3(A) to 3(D) are a side view illustrating how the coupling device according to the first embodiment is attached and detached. Here, (A) and (B) FIGS. 3(A) and 3(B) illustrate an attachment method, and (C) and (D) FIGS. 3(C) and 3(D) illustrate a detachment method.

FIG. 4 is a partial enlarged cross-sectional view illustrating a coupling device according to a second embodiment.

FIGS. 5(A) and 5(B) are a partial enlarged view, where FIG. 5(A) shows a coupling device according to a third embodiment in which a bottom surface of an arm has a reception portion, and FIG. 5(B) shows a coupling device according to a fourth embodiment in which a top surface of an arm has a reception portion.

FIGS. 6(A) to 6(D) are a partial enlarged view, where FIG. 6(A) shows a coupling device according to a fifth embodiment in which a bottom surface of an arm has a reception portion and a top surface of the arm has a depressed portion, FIG. 6(B) shows a coupling device according to a sixth embodiment in which a bottom surface of an arm has a reception portion and a top surface of the arm has a protruded portion, FIG. 6(C) shows a coupling device according to a seventh embodiment in which a top surface of an arm has a reception portion and a bottom surface of the arm has a depressed portion, and FIG. 6(D) shows a coupling device according to an eighth embodiment in which a top surface of an arm has a reception portion and a bottom surface of the arm has a protruded portion.

FIGS. 7(A) to 7(D) are a partial enlarged view, where FIG. 7(A) shows a coupling device according to a ninth embodiment in which a bottom surface of an arm has a reception portion and a pressing portion is a vertex portion, FIG. 7(B) shows a coupling device according to a tenth embodiment in which a bottom surface of an arm has a reception portion and a pressing portion is an end, FIG. 7(C) shows a coupling device according to an eleventh embodiment in which a top surface of an arm has a reception portion and a pressing portion is protruded, and FIG. 7(D) shows a coupling device according to a twelfth embodiment in which a top surface of an arm has a reception portion and a pressing portion is an end.

FIGS. 8(A) to 8(D) are a partial enlarged view, where FIG. 8(A) shows a coupling device according to a thirteenth embodiment in which a bottom surface of an arm has a reception portion and a pressing portion is a vertex portion, FIG. 8(B) shows a coupling device according to a fourteenth embodiment in which a bottom surface of an arm has a reception portion and a pressing portion is an end, FIG. 8(C) shows a coupling device according to a fifteenth embodiment in which a top surface of an arm has a reception portion and a pressing portion is a vertex portion, and FIG. 8(D) shows a coupling device according to a sixteenth embodiment in which a top surface of an arm has a reception portion and a pressing portion is an end.

FIGS. 9(A) to 9(D) are a partial enlarged view, where FIG. 9(A) shows a coupling device according to a seventeenth embodiment in which a bottom surface of an arm has a reception portion and a pressing portion is a vertex portion, FIG. 9(B) shows a coupling device according to an eighteenth embodiment in which a bottom surface of an arm has a reception portion and a pressing portion is an end, FIG. 9(C) shows a coupling device according to a nineteenth embodiment in which a top surface of an arm has a reception portion and a pressing portion is a vertex portion, and FIG. 9(D) shows a coupling device according to a twentieth embodiment in which a top surface of an arm has a reception portion and a pressing portion is an end.

FIGS. 10(A) to 10(D) are a partial enlarged view, where FIG. 10(A) shows a coupling device according to a twenty-first embodiment in which a bottom surface of an arm has a reception portion and a pressing portion is a vertex portion, FIG. 10(B) shows a coupling device according to a twenty-second embodiment in which a bottom surface of an arm has a reception portion and a pressing portion is an end, FIG. 10(C) shows a coupling device according to a twenty-third embodiment in which a top surface of an arm has a reception portion and a pressing portion is a vertex portion, and FIG. 10(D) shows a coupling device according to a twenty-fourth embodiment in which a top surface of an arm has a reception portion and a pressing portion is an end.

FIGS. 11(A) to 11(D) are a partial enlarged view, where FIG. 11(A) shows a coupling device according to a twenty-fifth embodiment in which a bottom surface of an arm has a reception portion and pressing portions extend parallel to a front-rear direction of the arm, FIG. 11(B) shows a coupling device according to a twenty-sixth embodiment in which a top surface of an arm has a reception portion and pressing portions extend parallel to the front-rear direction of the arm, FIG. 11(C) shows a coupling device according to a twenty-seventh embodiment in which a bottom surface of an arm has a reception portion and pressing portions extend parallel to a width direction of the arm, and FIG. 11(D) shows a coupling device according to a twenty-eighth embodiment in which a top surface of an arm has a reception portion and pressing portions extend parallel to the width direction of the arm. In each figure, on the right is a front view, and on the left is a side view.

FIGS. 12(A) to 12(D) are a partial enlarged view, where FIG. 12(A) shows a coupling device according to a twenty-ninth embodiment in which a bottom surface of an arm has a reception portion and pressing portions extend parallel to the front-rear direction of the arm, FIG. 12(B) shows a coupling device according to a thirtieth embodiment in which a top surface of an arm has a reception portion and pressing portions extend parallel to the front-rear direction of the arm, FIG. 12(C) shows a coupling device according to a thirty-first embodiment in which a bottom surface of an arm has a reception portion and pressing portions extend parallel to the width direction of the arm, and FIG. 12(D) shows a coupling device according to a thirty-second embodiment in which a top surface of an arm has a reception portion and pressing portions extend parallel to the width direction of the arm. In each figure, on the right is a front view, and on the left is a side view.

FIG. 13 is a partial enlarged view illustrating a coupling device according to a thirty-third embodiment.

MODE FOR CARRYING OUT THE INVENTION

Embodiments of the present invention will be described below.

Hereinafter, in some cases, for convenience of explanation, a nozzle side is referred to as "down", an arm side is referred to as "up", a valve-device side is referred to as "front", and a valve-driving-device side is referred to as "rear".

First Embodiment

Discharge Device

As shown in FIG. 1, a discharge device 101 according to a first embodiment includes, as main components, a valve device 102, a valve driving device 103, and a base member 104 on which they are mounted. The discharge device 101 relates to a jet-type discharge device that discharges and flies a liquid material 117 in the form of a droplet.

The valve device 102 is mounted on a front side of the base member 104 and mainly includes a valve element 106 and a valve seat 108. The valve element 106 is a lower end portion of a valve stem 105 and is located in a liquid chamber 112 provided in a lower front of the base member 104. In the example, the valve element 106 has a cylindrical shape with a flat tip, but is not limited to this shape. For example, the tip may be spherical, depressed, or tapered, or may be provided with a projection at a position facing a discharge port 111.

Meanwhile, the valve stem 105 includes a contact portion 107 at an upper end thereof, and is in separable contact with an arm 121 of the valve driving device 103. The contact portion 107 of this embodiment is circular when viewed from above, and is larger in diameter than a main body of the valve stem 105. The contact portion 107 is not necessarily circular when viewed from above, but is preferably wider than the main body of the valve stem 105. A top surface of the contact portion 107, which is in contact with the arm 121, is curved (rounded) to be able to allow the contact position and angle to vary depending on pivoting of the arm 121 (reference symbols 122, 123). The valve stem 105 is inserted through a cylindrical bush 114 disposed in an insertion hole 113 and through an annular seal member 115. The liquid chamber 112 has a top surface having a hole leading to the insertion hole 113, and has a lower end to which a nozzle 110 having the discharge port 111 is attached. The valve seat 108 is disposed on a top surface of the nozzle 110 and constitutes a bottom surface of the liquid chamber 112. The valve seat 108 is provided with a through-hole 109 via which the liquid chamber 112 and the discharge port 111 of the nozzle 110 communicate with each other. The valve seat 108 and the nozzle 110 are separate members in FIG. 1, but may be integrated by forming the inner bottom surface of the nozzle 110 as the valve seat 108. The liquid chamber 112 includes, on a lateral side thereof, a liquid inlet 116 through which the liquid material 117 is supplied. The liquid inlet 116 is connected to a liquid material supply source such as a reservoir not shown.

The valve driving device 103 includes two actuators (118, 119) arranged in a front-rear direction on the base member 104. The actuators (118, 119) have respective lower ends coupled to a swinging mechanism not shown and respective upper ends fixed to the arm 121. The actuators (118, 119) are piezoelectric actuators constituted by piezoelectric elements with the same specifications each configured to elongate and contract in a stacking direction (vertical direction in FIG. 1) by applying a voltage. The arm 121 is a bar-like member extending from the actuators (118, 119) toward the valve device 102 and is fixed by a fixture 120 disposed between the two actuators (118, 119) such that the actuators (118, 119) are held between the arm 121 and the base member 104. The arm 121 has a reception portion 209 recessed in a front bottom surface, where the arm 121 is in contact with the contact portion 107 provided at the upper end of the valve stem 105. The arm 121 is coupled to the valve stem 105 by a coupling device 201 described later. The reception portion 209 is larger than the contact portion 107 of the valve stem 105, allowing a position and an angle of the valve stem 105 to vary depending on pivoting of the arm 121. The reception portion 209 has a depth similar to the thickness of the contact portion 107 of the valve stem 105. Since the arm 121 is coupled to the valve stem 105 by the coupling device 201, displacement of the actuators (118, 119) can be transmitted to the valve stem 105 via the arm 121 to move the valve element 106 forward to and backward from the valve seat 108.

The discharge device 101 of this embodiment is covered by a cover 124 represented by the dotted line in terms of operator protection and device protection.

The discharge device 101 in FIG. 1 operates generally as follows.

Assume that a neutral position of the valve element 106 is a position at the time when a front-side first actuator 118 and a rear-side second actuator 119 are not displaced.

When the front-side first actuator 118 is displaced to elongate, and the rear-side second actuator 119 is displaced to contract or is not displaced, the arm 121 pivots upward (counterclockwise in FIG. 1) around the fixture 120, resulting in the front of the arm 121 going up (reference symbol 122). When the front of the arm 121 goes up, the valve stem 105 coupled by the coupling device 201 goes up, and the valve element 106 moves away from the valve seat 108 (in this embodiment, this direction is referred to as a backward direction). A position of the valve element 106 at this time point is regarded as an upper position.

When the front-side first actuator 118 is displaced to contract or is not displaced, and the rear-side second actuator 119 is displaced to elongate, the arm 121 pivots downward (clockwise in FIG. 1) around the fixture 120, resulting in the front of the arm 121 going down (reference symbol 123). When the front of the arm 121 goes down, the valve stem 105 coupled by the coupling device 201 is pushed by the arm 121 to go down, and the valve element 106 moves closer to the valve seat 108 (in this embodiment, this direction is referred to as a forward direction). A position of the valve element 106 at this time point is regarded as a lower position.

The stroke is a movement distance from the upper position to the neutral position, from the neutral position to the lower position, or from the upper position to the lower position.

Combination of the above motions allows for moving the valve element 106 forward and backward in the liquid chamber 112. In particular, inertial force is applied to the liquid material 117 present below the valve element 106 by the downward motion so that the liquid material 117 can be discharged from the discharge port 111 of the nozzle 110.

Adjusting displacement amounts of the two actuators (118, 119) allows for adjusting the stroke amount. Adjusting the stroke amount allows for adjusting an amount of the liquid material 117 to be discharged from the discharge port 111 of the nozzle 110.

Coupling Device

(1) Configuration

As shown in FIGS. 2(A) to 2(C), the coupling device 201 of the discharge device 101 of the first embodiment includes a pressing portion 202, a locking portion 203, and a connecting portion 204. The coupling device 201 is formed of a plate-like elastic body as a whole and can elastically deform in the same direction as the arm 121 swings (see FIG. 1). In other words, the coupling device 201 can deform in such a direction that a gap between the pressing portion 202 and the locking portion 203 widens or narrows.

The pressing portion 202 is curved into a protruded or mountain-like shape toward the arm 121, and a vertex portion 205 of the curve is in contact with the contact portion 107 of the valve stem 105. The vertex portion 205 is in contact with a bottom surface of the contact portion 107 at approximately the same position in the front-rear direction as a central axis 210 of the valve stem 105. Since the valve stem 105 is located at the center of the contact portion 107, the pressing portion 202 is provided with a cutout 207 so as not to interfere with the valve stem 105. The pressing portion 202 exerts force (upward force in FIGS. 2(A) to 2(C)) pressing the contact portion 107 provided at the upper end of the valve stem 105 against the reception portion 209 provided in the front bottom surface of the arm 121. In other words, the contact portion 107 of the valve stem 105 is held between the reception portion 209 of the arm 121 and the pressing portion 202 of the coupling device 201. Since the pressing portion 202 is curved into a protruded or mountain-like shape, it can exert appropriate pressing force.

The locking portion 203 is provided at a position facing the pressing portion 202 across the arm 121. The locking portion 203 is curved into a protruded or mountain-like shape toward the arm 121 like the pressing portion 202, and a vertex portion 206 of the curve is in contact with the arm 121. The contact position of the vertex portion 206 of the locking portion 203 is approximately the same in the front-rear direction as the position of the central axis 210 of the valve stem 105. In other words, the vertex portion 206 of the locking portion 203 and the vertex portion 205 of the pressing portion 202 are symmetrically located. The locking portion 203 exerts force (downward force in FIGS. 2(A) to 2(C)) pressing the arm 121 against the valve stem.

The connecting portion 204 connects the pressing portion 202 and the locking portion 203 with each other in a "C"-shape when viewed from the side. In another expression, the pressing portion 202 and the locking portion 203 form a symmetrical shape with respect to the connecting portion 204 except the cutout 207.

The distance between the vertex portion 205 of the pressing portion 202 and the vertex portion 206 of the locking portion 203 is smaller than a vertical width of thearm 121 when the coupling device 201 is not attached to the arm 121. This configuration allows the coupling device 201 to exert the force pressing the valve stem 105 and the arm 121 against each other by the elasticity when it is attached to the arm 121. In other words, the coupling device 201 swingably fixes the valve stem 105 to the arm 121 in a pinching way. Meanwhile, the distance between an end of the pressing portion 202 and an end of the locking portion 203 is larger than the vertical width of the arm 121 when the coupling device 201 is not attached to the arm 121. This configuration allows the coupling device 201 to be easily attached to the arm 121 (see FIGS. 3(A) to 3(D)). When the coupling device 201 is completely attached to the arm 121, or when the vertex portion 205 of the pressing portion 202 is in contact with the bottom surface of the contact portion 107 at approximately the same position as the central axis 210 of the valve stem 105, the connecting portion 204 is in contact with a front-end surface of the arm 121.

(2) Attachment and Detachment Methods

Attachment and detachment methods of the valve stem 105 using the coupling device 201 of the first embodiment will be described.

Attachment Method

When the valve stem 105 is attached to the arm 121, first, the valve stem 105 is moved toward the arm 121 until the contact portion 107 of the valve stem 105 touches the reception portion 209 of the arm 121 (FIG. 3(A)). While the valve stem 105 is kept in this state, the coupling device 201 is moved toward the arm 121. The ends of the pressing portion 202 and the locking portion 203 touch a front edge of the arm 121, and then elastic deformation occurs which widens the gap between the pressing portion 202 and the locking portion 203 (FIG. 3(B)). When the coupling device 201 is further moved, the gap between the pressing portion 202 and the locking portion 203 is widened to the vertical width of the arm 121. Then, the contact portion 107 of the valve stem 105 is fixedly held between the reception portion 209 of the arm 121 and the pressing portion 202 of the coupling device 201. The coupling device 201 is moved until the connecting portion 204 thereof comes in contact with the front-end surface of the arm 121 to complete the attachment (see FIG. 2(B)). For easy attachment of the coupling device 201, the front-end portion of the arm 121 may be beveled or rounded so as to be narrowed toward the front end.

Detachment Method

When the valve stem 105 is detached from the arm 121, first, the coupling device 201 is moved toward the front so that the force pressing the contact portion 107 of the valve stem 105 against the reception portion 209 of the arm 121 is removed (FIG. 3(C)). The gap between the pressing portion 202 and the locking portion 203 is narrowed by the elasticity after the coupling device 201 is detached from the arm 121. Then, the valve stem 105 is separated from the arm 121 to complete the detachment (FIG. 3(D)).

Advantageous Effect

The coupling device 201 of the first embodiment described above exerts the force that brings the arm 121 and the valve stem 105 into constant contact. Hence, even when the arm 121 is rapidly moved by the actuators (118, 119), the problem that the valve stem 105 separates from the arm 121 does not occur. As such, even when the arm 121 is rapidly driven by the actuators (118, 119), the valve stem 105 can follow the motion of the arm 121. In addition, the actuators (118, 119) are not required to overcome spring resistance during operation, allowing for securing the stroke amount which is a movement distance of the valve element 106 from the valve seat 108 required for discharge. Moreover, the actuators (118, 119) are not required to be driven against a spring force, resulting in a small load on the actuators (118, 119). Furthermore, the coupling device 201 can fix the arm 121 with the valve stem 105 in the simple pinching way, allowing for easy attachment and detachment of the valve stem 105 that is relatively often replaced for adjustment, maintenance, or the like.

Second Embodiment

A coupling device 201 of a second embodiment is different from the coupling device 201 of the first embodiment in that a valve stem 105 is fixed from above.

As shown in FIG. 4, regarding the coupling device 201 of the second embodiment,an arm 121 has a reception portion 209 recessed in a front top surface. The arm 121 also has a hole 211 penetrating from a bottom surface of the reception portion 209 to a bottom surface of the arm 121. The valve stem 105 is inserted in this through-hole 211 and is fixed by the coupling device 201. The valve stem 105, which has a contact portion 107 at the upper end thereof as in the first embodiment, is different from the first embodiment in that the contact portion 107 has a rounded surface on a side (bottom surface) where the contact portion 107 and the valve stem 105 are connected. In the second embodiment, the rounded surface of the contact portion 107 is in contact with the bottom surface of the reception portion 209, allowing the contact position and angle to vary depending on pivoting of the arm 121.

Since the contact portion 107 is provided on the upper-surface side of the arm 121, the coupling device 201 has a pressing portion 202 on an upper side and a locking portion 203 on a lower side inversely with the first embodiment (FIGS. 2(A) to 2(C)). In additionthe locking , portion 203 is provided with a cutout 208 for the valve stem 105 to pass through. The valve stem 105 is attached and detached in almost the same way as in the first embodiment except that the valve stem 105 is inserted from above.

The coupling device 201 of the second embodiment can also achieve the same advantageous effect as the coupling device 201 of the first embodiment. In addition, the contact portion 107 of the valve stem 105 is supported by the reception portion 209 of the arm 121, which can prevent the valve stem 105 from falling during the attachment or detachment.

Third and Fourth Embodiments

Coupling devices 201 of third and fourth embodiments are different from the coupling devices 201 of the first and second embodiments in that they include a fastening member (screw) 213 inserting through a connecting portion 204.

Regarding a coupling device 201 of the third embodiment shown in FIG. 5(A), an arm 121 has a reception portion 209 in a bottom surface thereof, and a screw hole 214 in an upside of a front surface thereof so that it does not interfere with the reception portion 209.

Regarding a coupling device 201 of the fourth embodiment shown in FIG. 5(B), an arm 121 has a reception portion 209 in a top surface thereof, and a screw hole 214 in a downside of a front surface thereof so that it does not interfere with the reception portion 209.

In each of the third and fourth embodiments, the connecting portion 204 of the coupling device 201 has a hole 212 through which the fastening member 213 penetrates at a position corresponding to the screw hole 214. When the valve stem 105 is attached, the coupling device 201 is attached to the arm 121 as in the first and second embodiments, and the fastening member 213 is then attached to fix the coupling device 201. When the valve stem 105 is detached, the fastening member 213 is detached, and the coupling device 201 is then detached from the arm 121 as in the first and second embodiments.

The coupling devices 201 of the third and fourth embodiments can also achieve the same advantageous effect as the coupling devices 201 of the first and second embodiments. Furthermore, the additional fastening member 213 can surely fix the valve stem 105 to the arm 121, compared with the case where the fastening member 213 is absent.

Fifth to Eighth Embodiments

Coupling devices 201 of fifth to eighth embodiments are different from the coupling devices 201 of the first to fourth embodiments in that an arm 121 has a depressed or protruded portion on a top surface or a bottom surface thereof.

As shown in FIG. 6(A), regarding a coupling device 201 of the fifth embodiment where a valve stem 105 is attached from below, a top surface of an arm 121 is provided with a depressed portion 215 that follows a shape of a vertex portion 206 of a locking portion 203. In the fifth embodiment, the vertex portion 206 of the locking portion 203 engages with the depressed portion 215 when the coupling device 201 is attached, which can constrain a shift of the coupling device 201 especially in the front-rear direction.

As shown in FIG. 6(B), regarding a coupling device 201 of the sixth embodiment where a valve stem 105 is attached from below, a top surface of an arm 121 is provided with a protruded portion 216, and a locking portion 203 is curved into a "W"-shape (or "M"-shape) to follow a shape of the protruded portion 216. In the sixth embodiment, a depressed portion 217 formed in the middle of the "W"-shape (or "M"-shape) of the locking portion 203 engages with the protruded portion 216 of the arm 121 when the coupling device 201 is attached, which can constrain a shift of the coupling device 201 especially in the front-rear direction.

As shown in FIG. 6(C), regarding a coupling device 201 of the seventh embodiment where a valve stem 105 is attached from above, a bottom surface of an arm 121 is provided with a depressed portion 215 that follows a shape of a vertex portion 206 of a locking portion 203. In the seventh embodiment, the vertex portion 206 of the locking portion 203 engages with the depressed portion 215 when the coupling device 201 is attached, which can constrain a shift of the coupling device 201 especially in the front-rear direction.

As shown in FIG. 6(D), regarding a coupling device 201 of the eighth embodiment where a valve stem 105 is attached from above, a bottom surface of an arm 121 is provided with a protruded portion 216, and a locking portion 203 is curved into a "W"-shape (or "M"-shape) to follow a shape of the protruded portion 216. In the eighth embodiment, a depressed portion 217 formed in the middle of the W-shape (or M-shape) of the locking portion 203 engages with the protruded portion 216 of the arm 121 when the coupling device 201 is attached, which can constrain a shift of the coupling device 201 especially in the front-rear direction.

According to the fifth to eighth embodiments, it is possible to prevent the coupling device 201 from shifting or coming off from the arm 121. Furthermore, an operator can feel a sense of engagement of the vertex portion 206 of the coupling device 201 with the depressed portion 215 of the arm 121 or the depressed portion 217 of the coupling device 201 with the protruded portion 216 of the arm 121, and thus can easily confirm whether the coupling device 201 is fixed.

Ninth to Twelfth Embodiments

Ninth to twelfth embodiments disclose coupling devices 201 fixed to an arm 121 by a fixing portion 218 and a fastening member 213.

A coupling device 201 of the ninth embodiment shown in FIG. 7(A) includes a pressing portion 202 that is curved into a protruded or mountain-like shape toward an arm 121 and has a vertex portion 205 to be in contact with a contact portion 107 of a valve stem 105, and a fixing portion 218 that is connected to the pressing portion 202 and is shaped so as to follow an end surface of the arm 121. The arm 121 has a screw hole 214 that does not interfere with a reception portion 209. At a position corresponding to the screw hole 214, the fixing portion 218 has a hole 212 through which a fastening member 213 penetrates. In a state where the vertex portion 205 of the pressing portion 202 is in contact with the contact portion 107 of the valve stem 105 and the fixing portion 218 is in contact with the end surface of the arm 121, the fastening member 213 is attached to fix the coupling device 201. The pressing portion 202 is provided with a cutout 207 so as not to interfere with the valve stem 105.

A coupling device 201 of the tenth embodiment shown in FIG. 7(B) includes a pressing portion 219 that is curved into a hook-like shape toward an arm 121 and has an end to be in contact with a contact portion 107 of a valve stem 105, and a fixing portion 218 that is connected to the pressing portion 219 and is shaped so as to follow an end surface of the arm 121. The arm 121 has a screw hole 214 that does not interfere with a reception portion 209. At a position corresponding to the screw hole 214, the fixing portion 218 has a hole 212 through which a fastening member 213 penetrates. In a state where the end of the hook-like pressing portion 219 is in contact with the contact portion 107 of the valve stem 105 and the fixing portion 218 is in contact with the end surface of the arm 121, the fastening member 213 is attached to fix the coupling device 201. The pressing portion 202 is provided with a cutout 220 so as not to interfere with the valve stem 105.

Coupling devices 201 of the eleventh embodiment shown in FIG. 7(C) and the twelfth embodiment shown in FIG. 7(D) disclose configurations where a valve stem 105 is attached from above as in the second embodiment shown in FIG. 4.

The coupling devices 201 of the ninth to twelfth embodiments described above are designed such that the vertex portion 205 of the pressing portion 202 or the end of the hook-like pressing portion 219 is located inward of a surface of the arm 121 before the coupling device 201 is fixed to the arm 121. This configuration allows the valve stem 105 to be temporarily fixed to the arm 121 and then to be fixed by the fastening member 213. Since the coupling devices 201 have a fixing structure without the pinching way, they can be fixed with smaller force than the coupling devices 201 of the first to eighth embodiments having the pinching structure. Note that the hook-like pressing portion 219 disclosed in the tenth embodiment (FIG. 7(B)) and the twelfth embodiment (FIG. 7(D)) can be substituted for the pressing portion 202 of the coupling devices 201 of the first to fourth embodiments.

Thirteenth to Sixteenth Embodiments

Coupling devices 201 of thirteenth to sixteenth embodiments are different from the coupling devices 201 of the ninth to twelfth embodiments in that they further include an axle portion 221.

As shown in FIGS. 8(A) to 8(D), in the thirteenth to sixteenth embodiments, the axle portion 221 is provided at an end of a fixing portion 218 on a side opposite to a pressing portion (202, 219), and allows a coupling device 201 to pivot in the same direction R as an arm 121 swings. The axle portion 221 is formed by inserting an axle through throughholes provided in the arm 121 and the coupling device 201, and fixing the axle with a fixture. When a valve stem 105 needs to be replaced, rotating a fastening member 213 in a loosening direction and pivoting the coupling device 201 around the axle portion 221 allows for easy replacement of the valve stem 105.

In the thirteenth and fourteenth embodiments, a reception portion 209 is provided in a bottom surface of the arm 121 and the axle portion 221 is thus provided near a top surface of the arm 121.

In the fifteenth and sixteenth embodiments, the reception portion 209 is provided in the top surface of the arm 121 and the axle portion 221 is thus provided near the bottom surface of the arm 121.

In the thirteenth to sixteenth embodiments described above, the coupling device 201 is always coupled to the arm 121, which prevents loss of the coupling device 201. The fastening member 213 may be arranged to be unremovable from the fixing portion 218 to eliminate a risk of loss of the fastening member 213 as well.

Seventeenth to Twentieth Embodiments

Coupling devices 201 of seventeenth to twentieth embodiments are different from the coupling devices 201 of the ninth to twelfth embodiments in that it is fastened by a fastening member 213 to a top surface or a bottom surface of an arm 121.

A coupling device 201 of the seventeenth embodiment shown in FIG. 9(A) includes: a pressing portion 202 that is curved into a protruded (or mountain-like) shape toward an arm 121 and has a vertex portion 205 to be in contact with a contact portion 107 of a valve stem 105; and a fixing portion 218 that is connected to the pressing portion 202 and is shaped so as to follow a bottom surface of the arm 121. The pressing portion 202 is provided with a cutout 207 so as not to interfere with the valve stem 105. The arm 121 has a screw hole 214 and a reception portion 209 in the bottom surface thereof. At a position corresponding to the screw hole 214, the fixing portion 218 has a hole 212 through which a fastening member 213 penetrates. In a state where the vertex portion 205 of the pressing portion 202 is in contact with the contact portion 107 of the valve stem 105 and the fixing portion 218 is in contact with the bottom surface of the arm 121, the fastening member 213 is attached to fix the coupling device 201.

A coupling device 201 of the eighteenth embodiment shown in FIG. 9(B) includes a pressing portion 219 that is curved into a hook-like shape toward an arm 121 and has an end to be in contact with a contact portion 107 of a valve stem 105. The other components are similar to those of the coupling device 201 of the seventeenth embodiment shown in FIG. 9(A).

A coupling device 201 of the nineteenth embodiment shown in FIG. 9(C) includes: a pressing portion 202 that is curved into a protruded (or mountain-like) shape toward an arm 121 and has a vertex portion 205 to be in contact with a contact portion 107 of a valve stem 105; and a fixing portion 218 that is connected to the pressing portion 202 and is shaped so as to follow a top surface of the arm 121. The arm 121 has a reception portion 209 with a through-hole 211, and a screw hole 214 in the top surface of the arm 121. At a position corresponding to the screw hole 214, the fixing portion 218 has a hole 212 through which a fastening member 213 penetrates. In a state where the valve stem 105 is inserted through the through-hole 211, the vertex portion 205 of the pressing portion 202 is in contact with the contact portion 107 of the valve stem 105, and the fixing portion 218 is in contact with the top surface of the arm 121, the fastening member 213 is attached to fix the coupling device 201.

A coupling device 201 of the twentieth embodiment shown in FIG. 9(D) includes a pressing portion 219 that is curved into a hook-like shape toward an arm 121 and has an end to be in contact with a contact portion 107 of a valve stem 105. The other components are similar to those of the coupling device 201 of the nineteenth embodiment shown in FIG. 9(C).

In the coupling devices 201 of the seventeenth to twentieth embodiments described above, the fastening member 213 is not fastened to the tip-end surface of the arm 121, allowing for reducing a substantial length of the arm 121.

Twenty-First to Twenty-Fourth Embodiments

Coupling devices 201 of twenty-first to twenty-fourth embodiments are different from the coupling devices 201 of the seventeenth to twentieth embodiments in that they further include an axle portion 221.

As shown in FIGS. 10(A) to 10(D), in coupling devices 201 of the twenty-first to twenty-fourth embodiments, the axle portion 221 is provided at an end of a fixing portion 218 on a side opposite to a pressing portion (202, 219), and allows a coupling device 201 to pivot in the same direction R as an arm 121 swings. In the twenty-first to twenty-fourth embodiments, the coupling device 201 is always coupled to the arm 121, which prevents loss of the coupling device 201. The fastening member 213 may be unremovable from the fixing portion 218 to eliminate a risk of loss of the fastening member 213 as well.

Twenty-Fifth to Twenty-Eighth Embodiments

Twenty-fifth to twenty-eighth embodiments disclose coupling devices 201 fixed to an arm 121.

As shown in FIG. 11(A), a coupling device 201 of the twenty-fifth embodiment includes a pair of pressing portions 202 each constituted by a plate-like elastic body that is "M"-shaped when viewed from the side. A bottom surface of an arm 121 is provided with a recessed groove 223 extending in a width direction of the arm 121, and a deep groove 222 recessed almost in the middle of a top surface of the recessed groove 223. The deep groove 222 functions as a first reception portion that receives a first contact portion 224, and the recessed groove 223 functions as a second reception portion that receives second contact portions 225.

The pair of pressing portions 202 are provided so as to straddle the recessed groove 223. The two identical pressing portions 202 are arranged parallel to each other with a gap therebetween in the width direction of the arm 121. The pressing portions 202 each have fixing bridges 230 extending from both ends of the pressing portions 202, and are attached to the bottom surface of the arm 121 by fixing the fixing bridges 230 thereto. A valve stem 105 includes: the first contact portion 224 that is provided at an upper end thereof and has a rounded surface; and the round-bar-like second contact portions 225 that are provided below the first contact portion 224 and project from a central axis 210 of the valve stem 105 to opposite sides. In other words, the second contact portions 225 horizontally project from the valve stem 105, and the valve stem 105 and the second contact portions 225 form a cross shape. A total span of the second contact portions 225 is shorter than the width of the arm 121 and a gap of the recessed groove 223, and is longer than the gap of the coupling devices 201 provided parallel to each other.

When the valve stem 105 is attached to the arm 121, first, an extending direction of the second contact portions 225 of the valve stem 105 is aligned with an extending direction of the two pressing portions (202, 202), and then the first contact portion 224 of the valve stem 105 is placed at the position where it touches the deep groove 222 of the arm 121. In other words, the valve stem 105 is moved such that the second contact portions 225 of the valve stem 105 pass between the two pressing portions (202, 202). Next, the valve stem 105 is rotated around the central axis 210 of the valve stem 105 in the state where the first contact portion 224 of the valve stem 105 is in contact with the deep groove 222 of the arm 121. Then, the second contact portions 225 each elastically deform the pressing portion 202 to bend it downward and move over a protruded portion 227 of the "M"-shape, and engage with a depressed portion 226 of the "M"-shape. When the second contact portions 225 are engaged with the depressed portion 226 of the "M"-shape, the pressing portions 202 exert force pressing the valve stem 105 upward by the elasticity and fix the valve stem 105 to the arm 121. In this way, the coupling device 201 of the twenty-fifth embodiment allows for fixing the valve stem 105 with the simple operation of just inserting the valve stem 105.

As shown in FIG. 11(B), a coupling device 201 of the twenty-sixth embodiment is provided on a top surface of an arm 121. A difference from the twenty-fifth embodiment is that the arm 121 has no deep groove 222, but instead has a hole 211 through which a valve stem 105 is inserted. The valve stem 105 is inserted in a recessed groove 223 from above, and is thus not required to have a rounded first contact portion 224.

As shown in FIG. 11(C), in a coupling device 201 of the twenty-seventh embodiment, two pressing portions (202, 202) are oriented in a direction perpendicular to a longitudinal direction of an arm 121. That is, the oriented direction of the two pressing portions (202, 202) in the twenty-seventh embodiment is 90 degrees different from that of the coupling device 201 of the twenty-fifth embodiment shown in FIG. 11(A).

As shown in FIG. 11(D), in a coupling device 201 of the twenty-eighth embodiment, two pressing portions (202, 202) are oriented in the direction perpendicular to the longitudinal direction of an arm 121. That is, the oriented direction of the two pressing portions (202, 202) in the twenty-eighth embodiment is 90 degrees different from that of the coupling device 201 of the twenty-sixth embodiment shown in FIG. 11(B).

In the twenty-sixth to twenty-eighth embodiments described above, the valve stem 105 can be fixed with the simple operation of just rotating the valve stem 105 as in the twenty-fifth embodiment.

Twenty-Ninth to Thirty-Second Embodiments

As shown in FIG. 12(A), a coupling device 201 of the twenty-ninth embodiment includes fixing bridges 231*a*, 231*b* each constituted by a round-bar-like elastic body provided on a bottom surface of an arm 121. The bottom surface of the arm 121 is provided with a recessed groove 223 extending in a transversal direction (width direction) of the arm 121, and the fixing bridges 231*a*, 231*b* are provided so as to straddle the recessed groove 223. The two identical fixing bridges 231*a*, 231*b* are arranged parallel to each other with a gap therebetween in the transversal direction (width direction) of the arm 121, and each have one end fixed with a fixture 232*a* and another end fixed with a fixture 232*b*. A valve stem 105 includes a contact portion 107 larger in diameter than the valve stem 105 at an upper end of the valve stem 105. The contact portion 107 has a rounded top surface and a rounded bottom surface. The contact portion 107 has a diameter smaller than a width W of the arm 121 and an opening width of the recessed groove 223, and thus can be housed in the recessed groove 223. That is, the recessed groove 223 corresponds to the reception portion of the first embodiment.

Moreover, the gap between the two fixing bridges 231*a*, 231*b* is slightly smaller than the diameter of the contact portion 107. For example, it is disclosed that a distance of the gap may be set such that the diameter of the contact portion 107 is approximately the same as the distance between the centers of the two fixing bridges 231*a*, 231*b*, or that the diameter of the contact portion 107 is approximately the same as the distance between the outermost edges of the two fixing bridges 231*a*, 231*b*. Furthermore, a distance between a level of the two fixing bridges 231*a*, 231*b* and that of a top surface of the recessed groove 223 is smaller than the thickness of the contact portion 107 of the valve stem 105. For example, the distance may be smaller by the thickness of a curved portion (prominence) of the contact portion 107.

The valve stem 105 is attached to the arm 121 as follows. Starting with a state where the top surface of the contact portion 107 of the valve stem 105 is in contact with the two fixing bridges 231*a*, 231*b*, the valve stem 105 is raised closer to the arm. Then, the two fixing bridges 231*a*, 231*b* elastically deform such that they bend in a width direction of the arm along the curve of the top surface of the contact portion 107. After the deformation progresses to the size of the diameter of the contact portion 107, in other words, to an end of the curve of the top surface of the contact portion 107, the contact portion 107 of the valve stem 105 passes between the two fixing bridges 231*a*, 231*b* to touch the top surface of the recessed groove 223. Then, the two fixing bridges 231*a*, 231*b* return to the original shape along the curve of the bottom surface of the contact portion 107. Since the distance between the level of the two fixing bridges 231*a*, 231*b* and that of the top surface of the recessed groove 223 is smaller than the thickness of the contact portion 107, the contact portion 107 is subjected to upward pressing force by the two fixing bridges 231*a*, 231*b* and the valve stem 105 is fixed to the arm 121. In this way, the valve stem 105 can be fixed to the arm 121 with the simple operation of just tucking the contact portion 107 of the valve stem 105 into the coupling device 201.

As shown in FIG. 12(B), a coupling device 201 of the thirtieth embodiment is provided on a top surface of an arm 121. A difference from the twenty-ninth embodiment shown in FIG. 12(A) is that the arm 121 has a hole 211 through which a valve stem 105 is inserted. That is, the valve stem 105 is attached by inserting it in a recessed groove 223 provided in the top surface of the arm 121. Also in the thirtieth embodiment, the valve stem 105 can be fixed to the arm 121 with the simple operation of just inserting the valve stem 105 into the coupling device 201.

As shown in FIG. 12(C), in a coupling device 201 of the thirty-first embodiment, fixing bridges 231*a*, 231*b* straddling a recessed groove 223 are oriented in the transversal direction of an arm 121. That is, the extending direction of the fixing bridges 231*a*, 231*b* of the coupling device 201 of the thirty-first embodiment is 90 degrees different from that of the coupling device 201 of the twenty-ninth embodiment shown in FIG. 12(A). Also in the thirty-first embodiment, the valve stem 105 can be fixed to the arm 121 with the simple operation of just tucking the valve stem 105 into the coupling device 201.

A coupling device 201 of the thirty-second embodiment shown in FIG. 12(D) is similar to that of the thirty-first embodiment, and fixing bridges 231*a*, 231*b* straddling a recessed groove 223 are oriented in the transversal direction of an arm 121. That is, the extending direction of the fixing bridges 231*a*, 231*b* of the coupling device 201 of the thirty-second embodiment is 90 degrees different from that of the coupling device 201 of the thirtieth embodiment shown in FIG. 12(B). Also in the thirty-second embodiment, the valve stem 105 can be fixed to the arm 121 with the simple operation of just inserting the valve stem 105 into the coupling device 201.

Thirty-Third Embodiment

Several configurations where the contact portion 107 of the valve stem 105 is wider than the valve stem 105 have been disclosed up to the thirty-second embodiment. However, the contact portion 107 is not necessarily wider than a middle portion of the valve stem 105.

As shown in FIG. 13, regarding a coupling device 201 of the thirty-third embodiment, a valve stem 105 includes a contact portion 107 having the same diameter as the valve stem 105, and a narrow portion 228 provided below the contact portion 107.

The contact portion 107 has a rounded top surface to be able to roll on a reception portion 209 when an arm 121 pivots. The narrow portion 228 is smaller in diameter than the contact portion 107, and a connecting section between the narrow portion 228 and the contact portion 107 constitutes a stepped portion 229. The shape of the narrow portion 228 is not limited to a cylindrical shape shown as the example. It is preferable that the narrow portion 228 can be engaged with a pressing portion 219, and the narrow portion 228 may be, for example, a groove or a through-hole. The narrow portion 228 is formed at a predetermined distance from a bottom surface of the arm 121 in a state where the contact portion 107 is in contact with the reception portion 209 of the arm 121. The coupling device 201 includes the pressing portion 219 that is curved into a hook-like shape toward the arm 121. The valve stem 105 is fixed to the arm 121 by disposing the coupling device 201 such that an end of the pressing portion 219 is in contact with the stepped portion 229 of the valve stem 105. Here, the pressing portion 219 may have a cutout that accepts the narrow portion 228. Since the coupling device 201 has a fixing structure without the pinching way, it can be fixed with smaller force than the coupling devices 201 of the first to eighth embodiments having the pinching structure.

The reception portion 209 of the arm 121 is of a size that allows the contact portion 107 of the valve stem 105 to roll. When the valve stem 105 is attached to the arm 121, the end of the hook-like pressing portion 219 is hooked on the stepped portion 229 of the valve stem 105 in a state where the contact portion 107 of the valve stem 105 is in contact with the reception portion 209 of the arm 121. Then, a locking portion 203 is moved to a top surface of the arm 121. The configuration of this embodiment is effective when an arm 121 is so small that it is difficult for a reception portion 209 to have a sufficient size, or when a lighter valve stem 105 is expected.

Note that the configuration of this embodiment can be combined with the configuration of the fastening member 213 in the third and fourth embodiments (FIGS. 5(A) and 5(B)), the configuration of the arm 121 of which top surface or bottom surface is provided with the depressed or protruded portion in the fifth to eighth embodiments (FIGS. 6(A) to 6(D)), or the configuration of the axle portion 221 and the fastening member 213 in the thirteenth to sixteenth embodiments (FIGS. 8(A) to 8(D)).

The preferred embodiments of the present invention have been described above. However, the technical scope of the present invention is not limited to the description of the above embodiments. Various alterations and modifications can be applied without departing from the technical idea of the present invention, and such altered or modified modes also fall within the technical scope of the present invention.

LIST OF REFERENCE SYMBOLS

101: discharge device/102: valve device/103: valve driving device/104: base member/105: valve stem/106: valve element/107: contact portion/108: valve seat/109: through-hole (valve seat)/110: nozzle/111: discharge port/112: liquid chamber/113: insertion hole/114: bush/115: seal member/116: liquid inlet/117: liquid material/118: first actuator/119: second actuator/120: fixture/121: arm/122: arm swinging direction (up)/123: arm swinging direction (down)/124: cover/201: coupling device/202: pressing portion/203: locking portion/204: connecting portion/205: vertex portion (pressing portion)/206: vertex portion (locking portion)/207: cutout (pressing portion)/208: cutout (locking portion)/209: reception portion/210: central axis of valve stem/211: through-hole (arm)/212: through-hole (coupling device)/ 213: fastening member/214: screw hole/215: depressed portion (arm)/216: protruded portion (arm)/217: depressed portion (locking portion)/218: fixing portion/219: (hook-like) pressing portion/220: cutout (hook-like pressing portion)/ 221: axle portion/222: deep groove (first reception portion)/ 223: recessed groove (second reception portion)/224: first contact portion/225: second contact portion/226: depressed portion (pressing portion)/227: protruded portion (pressing portion)/228: narrow portion (small-diameter portion)/229: stepped portion/230: fixing bridge (corrugated plate)/231: fixing bridge (round bar)/232: fixture/R: pivot direction of coupling device

The invention claimed is:

1. A liquid material discharge device comprising:

a valve stem having a valve element provided at a tip portion, and a contact portion;

a liquid chamber in which the valve element moves forward and backward;

a nozzle communicating with the liquid chamber;

a valve seat having a hole via which the liquid chamber and the nozzle communicate with each other;

an arm that is in separable contact with the valve stem; and a valve driving device configured to move the valve element forward to and backward from the valve seat by causing the arm to pivot;

wherein the liquid material discharge device further comprising a coupling device that is attached and fixed to the arm, and couples the valve stem with the arm, wherein the coupling device includes a pressing portion that presses the contact portion against the arm, wherein the arm has a reception portion where the contact portion of the valve stem is disposed, and when the arm pivots, the contact portion of the valve stem rolls on the reception portion.

2. The liquid material discharge device according to claim 1, wherein the pressing portion is constituted by a plate-like elastic body.

3. The liquid material discharge device according to claim 1, wherein the reception portion is formed in a top surface of the arm, wherein the arm includes a through-hole through which the valve stem is inserted, the through-hole being provided in the reception portion, wherein the contact portion is wider than the valve stem, and has a flat top surface and a rounded bottom surface.

4. The liquid material discharge device according to claim 1, wherein the reception portion of the arm is formed in a bottom surface of the arm, wherein the contact portion is wider than the valve stem, and has a flat bottom surface and a rounded top surface.

5. The liquid material discharge device according to claim 4, wherein the pressing portion includes a cutout portion in which the valve stem is disposed.

6. The liquid material discharge device according to claim 1, wherein the coupling device further includes a locking portion extending in a same direction as the pressing portion, and a connecting portion connecting the locking portion with the pressing portion, and wherein the arm is held between the locking portion and the pressing portion.

7. The liquid material discharge device according to claim 6, wherein the locking portion includes a vertex portion that is in contact with the arm.

8. The liquid material discharge device according to claim 7, wherein the arm includes a depressed portion that receives the vertex portion of the locking portion.

9. The liquid material discharge device according to claim 6, wherein the locking portion includes at least two vertex portions that are in contact with the arm, and a depressed portion located between the at least two vertex portions, wherein the arm includes a protruded portion received in the depressed portion of the locking portion.

10. The liquid material discharge device according to claim 6, wherein the pressing portion includes a vertex portion that is in contact with the contact portion.

11. The liquid material discharge device according to claim 6, comprising a fastening member that fastens the coupling device to the arm, wherein the connecting portion includes a hole through which the fastening member is inserted.

12. The liquid material discharge device according to claim 1, wherein the coupling device includes a fixing portion continuous with the pressing portion, and a fastening member that fixes the fixing portion to the arm.

13. The liquid material discharge device according to claim 12, wherein the fixing portion extends in a direction substantially perpendicular to the pressing portion and is fixed to a tip portion of the arm with the fastening member.

14. The liquid material discharge device according to claim 12, wherein the fastening member is fixed to a top surface or a bottom surface of the arm.

15. The liquid material discharge device according to claim 12, wherein the pressing portion includes a vertex portion that is in contact with the contact portion.

16. The liquid material discharge device according to claim 15, wherein the vertex portion of the pressing portion is located at an end of the pressing portion.

17. The liquid material discharge device according to claim 12, comprising an axle portion that pivotally fixes the coupling device to the arm.

18. The liquid material discharge device according to claim 1, wherein the pressing portion is constituted by a pair of bridges provided on the arm.

19. The liquid material discharge device according to claim 18, wherein the pressing portion includes plate-like elastic bodies having depressed portions, wherein the contact portion includes a first contact portion that is in contact with the arm, and second contact portions that project from the valve stem and are pressed by the depressed portions of the pair of bridges.

20. The liquid material discharge device according to claim 18, wherein the pressing portion includes round-bar-like elastic bodies, wherein the contact portion has a rounded top surface and a rounded bottom surface.

21. The liquid material discharge device according to claim 1, wherein the valve stem includes a narrow portion forming a stepped portion, wherein the pressing portion presses the stepped portion.

22. The liquid material discharge device according to claim 1, wherein the valve driving device includes a piezoelectric actuator.

23. The liquid material discharge device according to claim 1, wherein the valve driving device is configured to move the valve element forward to discharge a droplet from the nozzle.

* * * * *